June 27, 1950
O. J. POUPITCH
2,513,105
DRIVE STUD FASTENER
Filed Jan. 25, 1949
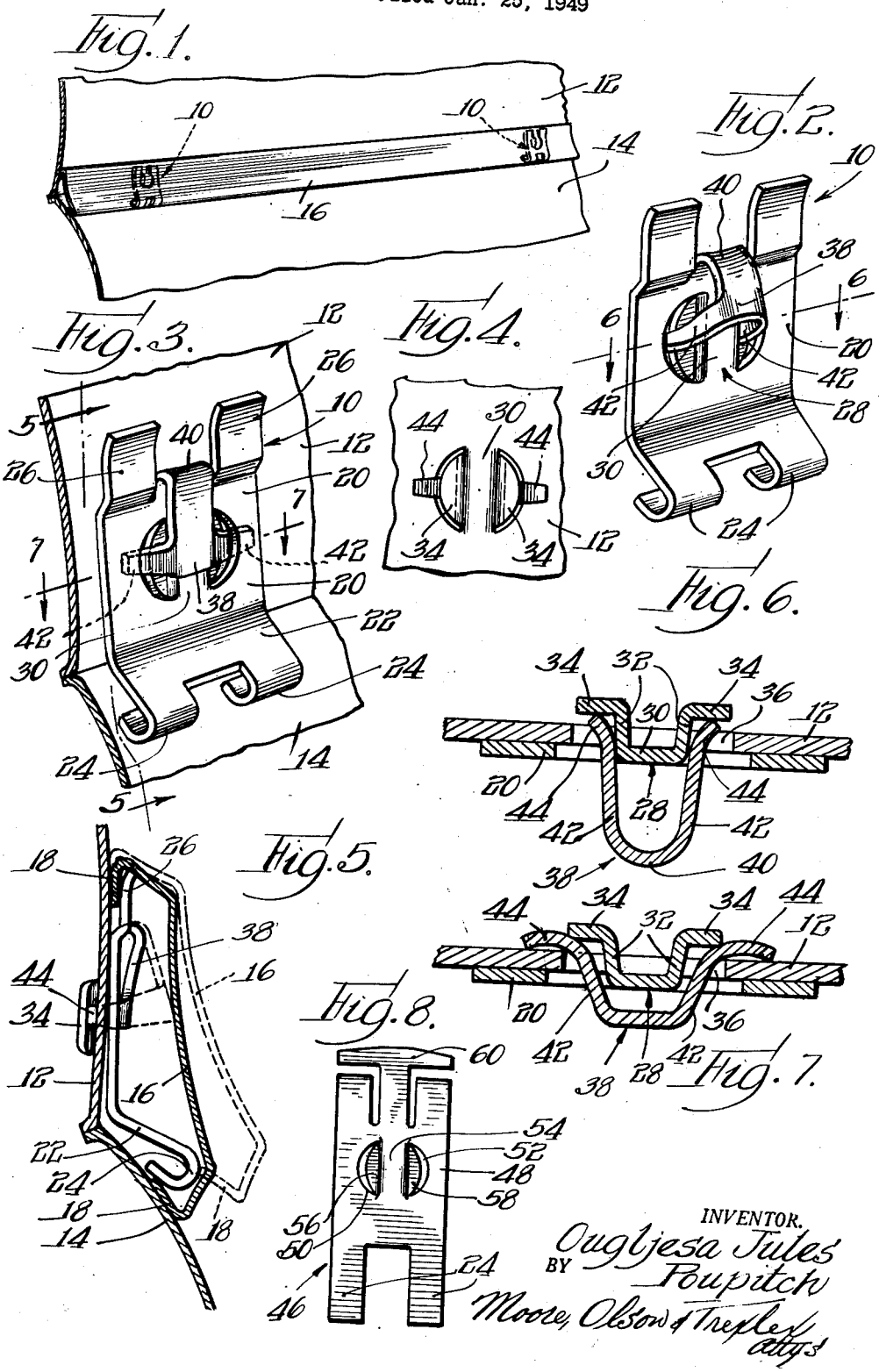
INVENTOR.
Ougljesa Jules Poupitch
BY Moore, Olson & Trexler
attys Patented June 27, 1950

2,513,105

UNITED STATES PATENT OFFICE 2,513,105

DRIVE STUD FASTENER

Ougljesa Jules Poupitch, Chicago, Ill., assignor to Illinois Tool Works, Chicago, Ill., a corporation of Illinois Application January 25, 1949, Serial No. 72,667

10 Claims. (Cl. 85—5)

This invention relates generally to fastening or mounting devices or clips having a deformable drive stud or prongs adapted to be deformed laterally so as to cooperate with an oppositely disposed portion to secure the device to the work piece.

Various forms of fastening and mounting devices for securing objects to work pieces and panels by assembling operations performed wholly on one side of the work piece or panel have heretofore been provided. Many of these prior devices are of the multi-part type, including one or more parts forming a socket which is first assembled with the work piece or panel and one or more parts forming an object supporting or securing member which is afterwards inserted in the socket and interlocked with the socket, and hence with the work piece, in a large variety of ways.

Another general type of such devices comprises a snap fastener member or members which is snapped into the aperture in a work piece and provided with, or associated with, an object supporting or securing member or means which is secured to the work piece or panel by the snap fastener member.

The snap fastener type is unsatisfactory for applications where positive interlocking of the object supporting or securing member and the work piece is required. In many of those applications requiring such positive interlocking of the member and work piece, the multi-part, or socket and stud type, the cost of the fastening device, the number and complexity of the required assembling operations, and the need for close tolerances in the fitting of the sockets in the work pieces and the stud part in the sockets, renders that type also impractical or commercially unsatisfactory, particularly for use in the mass production industries. The present invention is therefore concerned primarily with the provision of a simple, preferably one-piece, fastener, mounting device or clip which overcomes or avoids such defects or insufficiencies of the prior devices previously mentioned, and more particularly, the present invention is concerned with the provision of a fastening or mounting device having an object supporting, attaching, or body, portion including an upsetting anvil and a stud member, preferably integral with said portion, and having a plurality of prongs to be upset by the anvil on driving of the stud member so as to secure the mounting, attaching or body portion to a support, work piece, or panel.

More specifically, the present invention contemplates a fastener of the type referred to above which may be stamped from a sheet or strip, such as sheet metal, the article or object mounting or body portion providing an upsetting anvil adapted to be inserted through a work aperture and another portion or stud designed for driving into engagement with the anvil to be deformed or deflected thereby into locking engagement with the opposite side of the work aperture, thereby positively to interlock the article mounting or body portion with the work piece, plate or panel.

A further object of the invention is to provide a one-piece fastening device having stud and anvil portions insertable through a work aperture from one side thereof and adapted on driving of the stud to deflect or deform the stud laterally of the work aperture to engage and positively interlock with the opposite side of the work aperture.

A more specific object of the invention is to provide a blind fastener, of the positive interlocking type, in one piece, and preferably of a one-piece sheet metal stamping.

Still more specifically, it is an object of this invention to provide a moulding clip or fastener having a head portion or portions adapted for snap fastener engagement with the flanges of a moulding strip or the like, a body portion having an upsetting anvil, and a stud portion having a plurality of prongs formed integrally with the body and head portion and adapted on driving of the prongs through an aperture in a panel on which the moulding is to be mounted to be deflected by the anvil into positive interlocking engagement with the inner surface of the panel.

The foregoing and other objects and advantages will be more apparent from the following detailed description when considered in connection with the accompanying drawing wherein:

Fig. 1 is a fragmentary perspective view of a pair of angularly disposed work pieces having a moulding strip secured in overlying relationship to the juncture of said work pieces by fastening members or clips embodying the features of the present invention;

Fig. 2 is a view in perspective of one of the clips of Fig. 1 detached from the work pieces;

Fig. 3 is an enlarged fragmentary perspective view similar to Fig. 1 with the mouldings removed so as to more clearly illustrate the functional and structural characteristics of the fastener;

Fig. 4 is a fragmentary view in elevation taken from the inside surface of the work piece or panel with the clip in mounted position;

Fig. 5 is a fragmentary view in vertical section taken substantially along the line 5—5 of Fig. 3;

Fig. 6 is a view in horizontal section taken along the line 6—6 of Fig. 2, but with the clip associated with the work piece or panel;

Fig. 7 is a view in horizontal section taken substantially along the line 7—7 of Fig. 3; and Fig. 8 is a plan view of the one-piece stamped sheet metal blank from which the fastener of Figs. 1 to 7 is formed.

Referring now to the drawing wherein like numerals have been employed to designate similar parts throughout the various figures, it will be seen that one embodiment of the fastening device or clip contemplated by the present invention is designated generally by the numeral 10 in Figs. 1 to 7 inclusive.

In Fig. 1, two of the clips 10 are shown applied to a pair of angularly disposed work pieces or panels 12 and 14 which are secured at the apex of the angle in any convenient manner, it being desired to cover the joinder by a moulding strip 16. The moulding strip 16 has inturned flanges 18 and is held in position by the fasteners 10.

The fastener clip or mounting device 10 includes a body portion 20 and head portions which may be somewhat resilient and are formed by margins of the body portion 20, the head portion or lower margin 22 being bent out of the plane of the plate-like body portion 20 to the required angle and provided with a bifurcated, rolled margin, or beads 24. The opposite margin of the plate-like body portion 20 is curved, bent or offset slightly out of the plane of the plate-like body portion to provide a head portion having curved end lips or lugs 26 which may be somewhat resilient in a direction normal or transverse to the work piece 12 but are substantially rigid endwise or longitudinally of the lugs.

The material in the center of the plate-like body portion 20 is struck out to provide an upsetting anvil or prong deflecting section 28 comprising a central portion 30 substantially in the plane of the body portion 20, rearwardly extending arms 32 and oppositely projecting lateral extensions or portions 34, substantially parallel to the plate-like body portion 20 and its inner surface spaced from the inner surface of the work piece 12, the work piece 12 having an opening or aperture 36 to receive the upsetting anvil or prong deflecting section 28 of the fastener.

A stud section 38 is formed integrally with the plate-like body portion 20 for the marginal head portions 24 and 26. This stud section consists of an elongated portion or arm 40 extending over the plate-like body portion and the upsetting anvil or prong deflecting section 28. The opposite margins of the arm at its inner end are formed with inwardly extending deflectable prongs 42, the inner ends 44 of which curve or project oppositely and outwardly. The inner end of the arm 40 and the opposite prongs 42, form in initial, unfastened position, a substantially U-shaped, expandable stud having oppositely deflectable legs embracing, or adapted to embrace, the central section of the upsetting anvil and the rearwardly extending arms thereof and the free end portions 44 engaging, or adapted to engage, the laterally extending and prong deflecting end sections 34 of the upsetting anvil.

The fastener 10 may be formed from a one-piece sheet metal blank 46, Fig. 8, the body 48 of the blank being stamped in the form of an H having the central portion or cross bar of the H cut and bent to form spaced apart generally semi-circular openings 50 and 52 divided by the central cross piece 54, the openings being formed by stamping out the generally semi-circular sections which are bent backwardly to form the rearwardly offset lugs 56 and 58 integrally joined to the cross piece 54 by suitable arms, cross piece 54 and the lugs 56 and 58 and the connecting arms forming the anvil 28 of the completed fastener 10. Between the upper vertical arms of the H blank 48 there is formed a T-shaped section 60, the leg of the T being longer than the upper arms of the H and the cross bar of the T extending over the H portion of the blank. The cross bar of the T forms on bending the substantially U-shaped stud section 38 while the leg of the T forms the arm 40 of the completed fastener by which the stud section 30 is integrally joined to the body portion of the fastener.

In initially applying the fastener 10 to the work piece 12, the anvil 28 is inserted within the complementary aperture 36 in the work piece 12, as clearly illustrated in Fig. 6. It will be seen that during this initial insertion the body portion 20 and the stud section 38 assume the position shown in Fig. 6 in which the body portion abuts the surface of the work plate 12 and the stud section 38 embraces the side arms 32 of the anvil and extends from the anvil with the base of the U-shaped stud section substantially spaced from the central portion 30 of the anvil in projecting relation to receive the blows of a hammer or other driving tool. On driving of the stud inwardly relative to the body portion 20, the laterally directed extensions or anvil portions 34, engaging the curved ends 44 of the arms of the stud, spread the stud arms laterally and cause them to curve outwardly and inwardly toward the inner surface of the work piece or panel 12 until the ends of the stud arms are driven over the opposite edges of the aperture 36 in the work piece so as to secure the fastener against withdrawal from the work piece and then are driven into positive work clamping engagement between the flanges 34 and the inner surface of the panel thereby drawing the fastener into tight and firm permanent abutting engagement with the outer surface of the work piece. The object or article to be mounted on the work piece or panel 12 may be assembled with the object securing, attaching, or mounting portions of the fastener, such for example as the portions 24 and 26, after the fastener is assembled with the work piece. In the embodiment disclosed, where the fastener is formed to secure a molding to the work piece 12 to overlie the area of joinder of the panel 12 to the panel 14, the moulding is assembled with the fastener after its application to the work piece 12 in the manner as shown in the full and dash lines in Fig. 5. This is accomplished by first inserting the upper inturned flange 18 of the moulding between the lips or lugs 26 and then swinging the moulding downwardly over the fastener so that the lower flange 18 of the moulding snaps over the rolled margin or beads 24 of the fastener, the lateral resilience of the moulding being primarily utilized to effect assembly of the moulding with the fastener, although the head portion or lower margin 22 of the fastener may be somewhat resilient so as to permit the introduction of the lower flange 18 between the margin of beads 24 and the surface of the panel 14 and the consequent clamping of the flange or moulding to the panel 14 by the rolled margin or beads 24, all as shown in Fig. 5.

It will be seen that in the disclosed embodiment the fasteners 10 may be applied in a very simple manner to the work piece and the moulding assembled with the line of fasteners after they have all been secured to the work piece. It should be noted that while the fasteners should be assembled with the work piece in properly oriented position with respect to the panels 12 and 14, the fastener is subject to sufficient rotation after assembly with the work piece for proper subsequent alignment either by hand or by the automatic aligning action of the resilient moulding so that substantial errors in orientation or alignment of the fasteners is readily correctible on or at the time of assembly of the moulding with the line of fasteners.

It will be evident that the head portions or opposite margins 22 and 26 of the fastener function to clampingly hold the opposed margins of the moulding strip firmly in position on the work panels 12 and 14.

From the foregoing it will be apparent that applicant has provided a simple, preferably one-piece, fastener, mounting device or clip which overcomes or avoids the defects or insufficiencies of prior devices, and more particularly, a fastening or mounting device having an object supporting, attaching, or body, portion including an upsetting anvil and a stud member, preferably integral with said portion, and having a plurality of prongs to be upset by the anvil on driving of the stud member so as to secure the mounting, attaching or body portion to a support, work piece, or panel; a fastener of the type referred to previously which may be stamped from a sheet or strip, such as sheet metal, the article or object mounting or body portion providing an upsetting anvil adapted to be inserted through a work aperture and another portion or stud designed for driving into engagement with the anvil to be deformed or deflected thereby into locking engagement with the opposite side of the work aperture, thereby positively to interlock the article mounting or body portion with the work piece, plate or panel; a one-piece fastening device having stud and anvil portions insertable through a work aperture from one side thereof and adapted on driving of the stud to deflect or deform the stud laterally of the work aperture to engage and positively interlock with the opposite side of the work aperture; a blind fastener, of the positive interlocking type, in one piece, and preferably of a one-piece sheet metal stamping; and a moulding clip or fastener having a head portion or portions adapted for snap fastener engagement with the flanges of a moulding strip or the like, a body portion having an upsetting anvil, and a stud portion having a plurality of prongs formed integrally with the body and head portion and adapted on driving of the prongs through an aperture in a panel on which the moulding is to be mounted to be deflected by the anvil into positive interlocking engagement with the inner surface of the panel.

While, for purposes of illustration, certain structural embodiments have been shown in the drawings, it will be apparent that other modifications and changes are contemplated without departing from the spirit and scope of the appended claims.

The invention is hereby claimed as follows:

1. A blind fastener comprising a body member having an object mounting portion and a deforming anvil, and a deformable stud portion adapted on driving over said anvil into a work aperture from one side thereof to be deformed laterally over the other side thereof to secure the fastener to the work piece.

2. A blind fastener comprising a one-piece sheet metal member having an object mounting portion, a deforming anvil portion, said member being bent back upon itself to form a deformable stud portion adapted on driving over said anvil into a work aperture from one side thereof to be deformed laterally over the other side thereof to secure the fastener to the work.

3. A blind fastener comprising a sheet metal member having a flat body portion adapted for bearing engagement on an apertured part, an object mounting portion and a deforming anvil alignable with the aperture in said part, and a deformable stud adapted on driving over said anvil into said aperture from one side of said part to be deformed laterally over the other side of said part to secure the member to said part.

4. A blind fastener comprising a body member adapted for bearing engagement on an apertured part, said member having an object mounting portion and a deforming anvil insertable in the aperture in said part, and a deformable, hollow stud portion adapted on driving over said anvil into the aperture from one side of said part to be deformed laterally over the other side of said part to secure the member to the part.

5. A blind fastener comprising a sheet metal member adapted for bearing engagement on an apertured part, said member having an object mounting portion and a stud deforming lug portion insertable in the aperture in said part, and a deformable stud portion having a deflectable lug adapted on driving of the stud portion over said stud deforming lug portion into the aperture from one side of said part to be deformed laterally over the other side thereof to secure the member to said part.

6. A blind fastener comprising a sheet metal member having an object mounting portion adapted for bearing engagement with an apertured part, an object mounting portion, a stud deforming portion insertable in an aperture in said part, said stud deforming portion having spaced arms extendible through said aperture from one side of said part, said arms having outwardly extending free end portions positionable on the other side of said part, and a deformable stud portion having spaced arms adapted on driving over the stud deforming portion into the aperture from one side of said part to embrace the arms of the stud deforming portion and to be deformed laterally by the free end portions of said arms to extend over the other side of said part to secure the fastener thereto.

7. A blind fastener comprising a sheet metal member adapted to have bearing engagement on an apertured part and having an object mounting portion, and a generally L-shaped lug portion insertable in the aperture in said part to extend in the general direction of said part on the side opposite that engaged by said member, and a deflectable prong adapted on driving over said L-shaped lug portion from the driving side of said part to be deformed laterally over the other side of said part to secure the member to the part.

8. A blind fastener comprising a sheet metal member having a flat body portion, an object mounting portion formed integrally with said body portion, said body portion having spaced wing portions offset from the plane of said body portion and adapted to be inserted in an apertured work part, and a driving stud portion comprising a pair of spaced prongs positioned to engage and to be deformed laterally by said wing portions on driving of said stud portion to secure the fastened to the apertured work part.

9. A drive stud fastener comprising a one-piece sheet metal member having a body portion adapted for bearing engagement with an apertured part, an object securing portion, said body portion having oppositely extending wing portions offset from the plane of said body portion and adapted to be inserted in the aperture in said part, and an expandable stud portion having deflectable prongs adapted on driving of the stud portion from one side of the work part to engage and be expanded by said wing portions over the opposite side of the work part to secure the sheet metal member to the work part.

10. A blind fastener for securing a resilient moulding to an apertured work part, said fastener comprising a sheet metal member having a body portion adapted for bearing engagement with the work part, and marginal moulding attaching portions bent out of the plane of said body portion, said body portion having an upsetting anvil portion adapted to be inserted in the aperture in the work part, and an expandable stud portion formed integrally with said body portion and adapted on driving over said anvil portion toward said body portion to be expanded into engagement with the work part on the side opposite that engaged by the body portion.

OUGLJESA JULES POUPITCH.

REFERENCES CITED

The following references are of record in the file of this patent:

UNITED STATES PATENTS

| Number | Name | Date |
| --- | --- | --- |
| 1,256,311 | Hartwig | Feb. 12, 1918 |
| 2,128,005 | Lombard | Aug. 23, 1938 |
| 2,306,460 | Meyer et al. | Dec. 29, 1942 |
| 2,328,023 | Lang | Aug. 31, 1943 |
| 2,454,894 | Tatom | Nov. 30, 1948 |
| 2,460,722 | Waara | Feb. 1, 1949 |
| 2,471,254 | Waara | May 24, 1949 |